Nov. 29, 1960  T. R. DUNCAN  2,961,911
DRIVE MECHANISM FOR MUSIC BOXES
Filed March 5, 1958  2 Sheets-Sheet 1

THEODORE R. DUNCAN,
INVENTOR.

BY *Mason & Graham*

ATTORNEYS.

Nov. 29, 1960 T. R. DUNCAN 2,961,911
DRIVE MECHANISM FOR MUSIC BOXES
Filed March 5, 1958 2 Sheets-Sheet 2
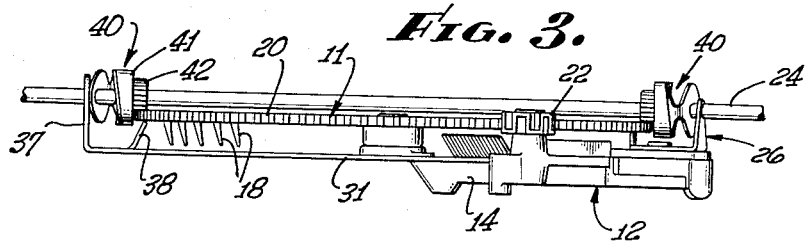
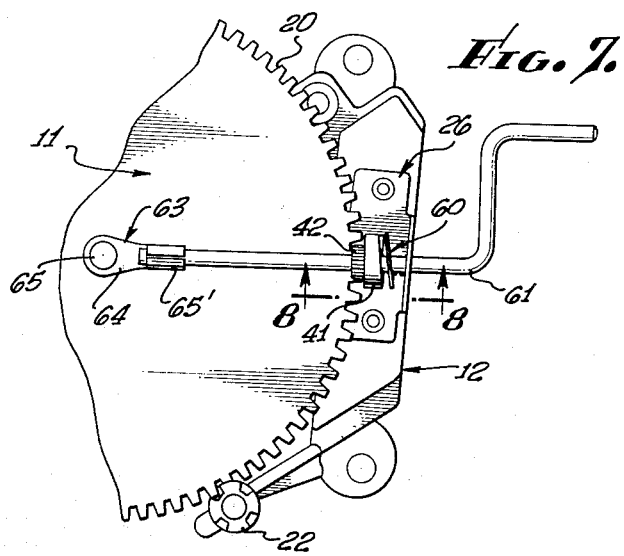
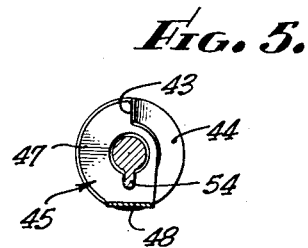
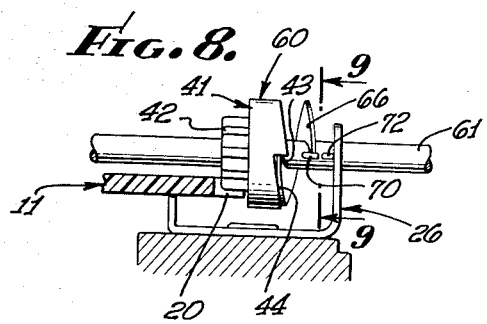
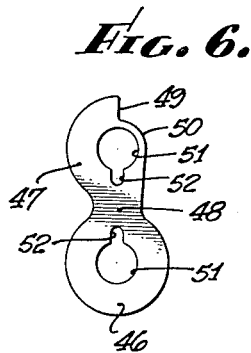
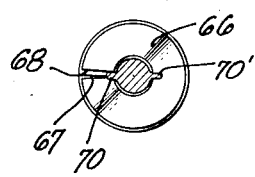
THEODORE R. DUNCAN
INVENTOR.
BY Mason + Graham
ATTORNEYS

United States Patent Office 2,961,911
Patented Nov. 29, 1960

2,961,911

DRIVE MECHANISM FOR MUSIC BOXES

Theodore R. Duncan, North Hollywood, Calif., assignor to Mattel Incorporated

Filed Mar. 5, 1958, Ser. No. 719,299

8 Claims. (Cl. 84—97)

This invention has to do generally with music boxes of the type embodying a rotatable plucking disk having gear teeth on its periphery for engagement by a drive pinion and particularly with drive mechanisms for this type of device.

An object of the invention is to provide a novel drive or clutch mechanism, particularly designed for use between a shaft and a member rotatable thereon for driving such member in a given direction in response to rotation of the shaft in a given direction.

Another object is to provide a drive mechanism whereby the plucking disk of a music box or other rotatable member may be driven in one direction only by rotating a shaft in either direction.

More particularly it is an object to provide a ratchet-like clutch or drive connection means which is quiet, positive in operation when driven in the forward direction, and which readily disengages when turned backward.

A further object is to provide a simple mechanism of the type indicated which is inexpensive to make, with the drive element made of sheet metal.

A further object is to provide a drive mechanism for a music box device of the type having a rotatable plucking disk with gear teeth on its periphery which are engaged by one or more drive pinions, which mechanism embodies novel bracket elements for supporting a drive shaft and for guiding and supporting the plucking disk to maintain it in its normal plane.

These and other objects will be apparent from the drawings and the following description. Referring to the drawings:

Fig. 3 is a side elevational view of the device of Fig. 1;

Fig. 5 is a sectional view on line 5—5 of Fig. 4;

Fig. 6 is a plan view of the drive element of the clutch means shown flat after it has been stamped but before it has been bent to final form;

Fig. 7 is a fragmentary plan view of a music box device embodying a modified form of clutch or drive mechanism;

Fig. 8 is an enlarged fragmentary sectional view on line 8—8 of Fig. 7; and

Fig. 9 is a sectional view on line 9—9 of Fig. 8.

Figure 1:
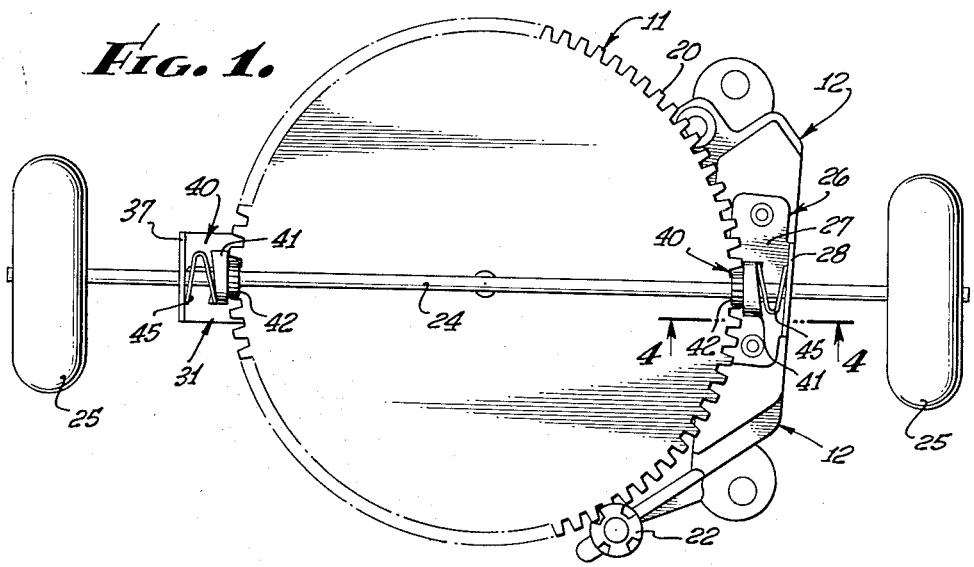
Fig. 1 is a plan view of a form of music box device embodying the invention.

More particularly describing the invention, numeral 11 generally indicates the plucking disk of a music box device which includes a base member 12 having an arm 14 upon which the plucking disk is rotatably mounted. A music comb 15 having vibrators 16 is mounted in the base and in this particular type of device the ends of the vibrators are inclined at 17 to position them in the path of the plucking projections 18 on the disk. The disk is provided with gear teeth 20 on its periphery. In order to steady and guide the disk at its periphery in the region where the projections engage the ends of the comb vibrators, a semi-shrouded pinion 22 is provided on the base.

The device shown in Fig. 1 is designed for use where the drive shaft, designated 24, may be rotated in either direction and for this purpose it is shown provided with wheels 25, keyed or otherwise fixed thereto which could engage the ground as where the device might be mounted in a wheeled toy or the like and this could be driven in either direction and yet rotate the disk 11 in only the forward direction. The shaft 24 is supported upon the comb base at one end in a bracket 26 which includes a base portion 27, shown riveted to the base of the music comb, and an apertured flange 28 through which the shaft extends. The bracket also has an upright tab 30 which is positioned beneath the disk in position to act as a guide therefor.

Figure 2:
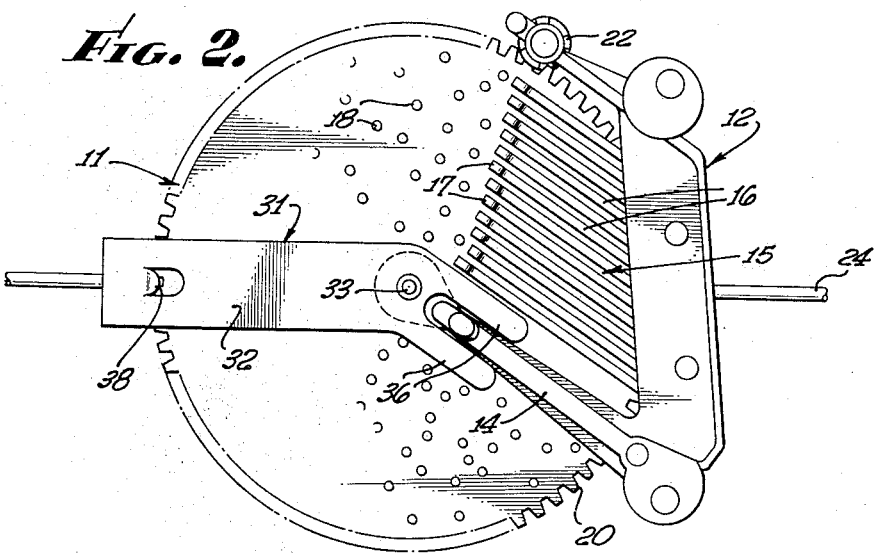
Fig. 2 is an inverted plan view of the device of Fig. 1.
Figure 4:
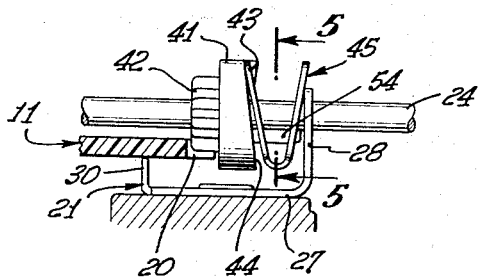
Fig. 4 is an enlarged fragmentary sectional view of the drive or clutch mechanism on line 4—4 of Fig. 1, but on a larger scale.

The shaft is also supported in a bracket 31 which consists of a main portion 32 secured by rivet 33 to the arm 14 of the base. The main portion terminates at its inner end in a bifurcated angularly disposed end section 36 which straddles the arm 14 as best shown in Fig. 2, thereby anchoring the bracket against pivotal movement. The outer end of the bracket has an upright mounting flange 37 which is apertured to receive the shaft. The bracket 31 also is provided with an upright tab 38 for engaging the under surface of the disk and to act as a guide therefor.

I provide two oppositely disposed, but otherwise similar clutch or drive mechanisms 40 between the shaft and the disk. Thus irrespective of the rotation of the shaft, the disk will be driven in the same direction at all times. Referring particularly to Figs. 4–8, each of these clutch devices is in the nature of a ratchet and includes a driven member 41 which includes gear teeth 42 for meshing with the teeth 20 on the periphery of the disk. The outer side of member 41 is formed with two radial shoulders 43, and, between these, inclined surfaces 44. Associated with each of the members 41 is a drive member 45 which may be made of sheet metal having spring quality. This member may be readily fabricated by stamping and the stamped shape thereof is shown in Fig. 6 from which it will appear that there are two major portions, designated 46 and 47 connected by a relatively narrow central or bridging portion 48. The portion 46 is shown as generally circular in configuration, while the periphery of the other portion 47 is semi-circular, being interrupted by a radially extending edge 49 and a continuing edge portion 50. Each of the members 46 and 47 is provided with an opening 51 having a radially projecting slot or elongated portion 52 at one side which is adapted to receive an axial rib 54 on the shaft. Each member is bent to a U-shape substantially as it appears in Fig. 4 from which it can be seen that, when installed, the shaft is received in the two openings in the member with the rib 54 of the shaft received in the portions 52 of the openings. The member is treated after forming to give it spring quality.

It will be apparent that, when the shaft shown in Fig. 1 is rotated clockwise, the edge 49 of the member 45 forming part of clutch assembly 40 shown at the right side of the disk 11 will engage one of the radial shoulders 43 on the driven member 41 driving the latter and in turn the disk. On the other hand, if the shaft is rotated counterclockwise, the parts 41 and 45 of the same clutch assembly 40 become disengaged and the edge 49 merely rides backward over the intervening inclined surfaces 44 between the radial shoulders of the member 41. At the same time the other clutch assembly engages to drive the disk.

The tabs 30 and 38 on the members 26 and 31, respectively, serve to hold the disk in position to engage the teeth of the driven members 41.

Referring now to Figs. 7-9, I show a music box device of the same general type as previously described. However, in this case I provide a single drive or clutch mechanism 60 between the shaft, here designated 61, and the disk 11. This shaft, shown as a crank, is supported at the outer edge of the disk in the same type of bracket 26 previously described. At its inner end the shaft is supported in a member 63 which consists of a flat apertured base portion 64 secured by a rivet 65 to the arm 14 of the base 12, and a tubular section 65' which receives the inner end of the shaft.

In the form of the invention shown in Figs. 7-9, I provide a helically shaped, split annular flat drive member 66 made of flat, spring quality metal and presenting the two radially extending edges 67 and 68 which are axially offset as best appears in Fig. 8. Edge 67 is free to engage one of the shoulders 43 on the member 41 when the crank or shaft is turned in a clockwise direction. A projection 70 on the shaft engages the other edge 68 of the member to provide a driving connection between the shaft and the member. To reduce the amount of lost motion, I provide a second projection 70' disposed 180° around the shaft from projection 70. Also, to limit axial movement of the shaft I provide a pair of projections 72 for abutment with the bracket 26.

I claim:

1. In a music box device having a base with a music comb extending therefrom and a circular peripherally toothed disk rotatably mounted on the base and having plucking projections engageable with the vibrators of the music comb, means for driving said disk, comprising a shaft mounted on said base, a pair of pinions rotatably mounted on said shaft and engageable with the toothed peripheral edge of said disk at diametrically opposite edge portions thereof, respectively, means for establishing a drive connection between said shaft and one of said pinions when said shaft is rotated in one direction, and means for establishing a driving connection between said shaft and the other of said pinions when the shaft is rotated in the opposite direction.

2. In a music box device having a base including a main portion and an arm projecting laterally thereof, a music comb supported by the main portion of the base and having vibrators projecting laterally beyond the main portion, and a plucking disk rotatably supported on the arm of the base, said disk having peripheral gear teeth, means for driving said disk, comprising bracket means on said base providing a pair of apertured shaft-receiving portions disposed 180° apart relative to the disk, a shaft rotatably mounted in said bracket means, a pair of drive pinions engageable with said disk at opposite sides thereof and carried on said shaft, and a unidirectional drive connection between said shaft and each of said pinions.

3. A drive member for use in a ratchet-like drive mechanism comprising a body of springy sheet metal formed to provide a pair of end portions and a central connecting bridge portion, said end portions being apertured to receive a shaft, and one of said end portions presenting a substantially radially extending leading edge for engagement with a member to be driven, said bridge portion being curved sufficiently to cause said end portions to lie in diverging planes with the apertures thereof disposed about a common axis.

4. In a music box device having a base member with a main portion supporting a music comb and an arm extending laterally of the main portion supporting a rotatable plucking disk, means for supporting a shaft adjacent the periphery of the disk in a region spaced from the main portion of the disk, comprising a bracket secured intermediate its ends to said arm and having a bifurcated inner end portion receiving a portion of the arm to prevent pivotal movement of the bracket relative to the arm, said bracket being disposed chiefly on one side of said disk and having an apertured outer end portion beyond the periphery of the disk and projecting beyond the plane of the other side of said disk for journaling a shaft.

5. The means set forth in claim 4 in which said bracket is provided with a guide tab closely adjacent said one side of said disk to prevent deflection of the disk in one direction.

6. In a drive mechanism for use as described, a support, a shaft rotatably mounted on the support, a driven member rotatably mounted on said shaft, said member presenting an axially projecting abutment laterally of the axis of rotation of the member at one end thereof, a drive member comprising a piece of springy sheet metal having a pair of spaced apertures and bent to provide two shaft-receiving, diverging end portions connected by a bridge portion, said drive member presenting a leading edge portion facing said abutment, a drive connection between said shafe and said drive member, said drive member being sufficiently resilient to permit said leading edge portion to retract axially from said abutment upon rotation of the drive member in a reverse direction, and means carried by the support for supporting said drive member against axial movement of its other end away from said driven member.

7. The drive mechanism set forth in claim 6 in which the drive connection between said shaft and drive member comprises non-circular interengaging means between the shaft and the apertured portions of the drive member.

8. In a drive mechanism for use as described, a support, a shaft rotatably mounted on the support a driven member rotatably mounted on said shaft, said member presenting an axially projecting abutment laterally of the axis of rotation of the member at one end thereof, a drive member comprising a springy, helically-shaped, split annular member having axially spaced end portions and presenting a leading edge portion facing said abutment, a drive connection between said shaft and said drive member, said drive member being sufficiently resilient to permit said leading edge portion to retract axially from said abutment upon rotation of the drive member in a reverse direction, and means carried by the support for supporting said drive member against axial movement of its other end away from said driven member.

References Cited in the file of this patent

UNITED STATES PATENTS

| | | |
|---|---|---|
| 905,244 | Stewart | Dec. 1, 1908 |
| 1,484,965 | Ritter | Feb. 26, 1924 |
| 1,893,897 | Hummer | Jan. 10, 1933 |
| 2,552,288 | Lee | May 8, 1951 |
| 2,557,061 | Goldman | June 19, 1951 |
| 2,735,328 | Bangs | Feb. 21, 1956 |

FOREIGN PATENTS

| | | |
|---|---|---|
| 392 | Switzerland | June 13, 1902 |
| | Addition to 24,334 | |
| 530,606 | Germany | July 30, 1931 |